Dec. 2, 1958     G. E. PIHL     2,863,118
VACUUM TUBE VOLTMETER
Filed May 29, 1957     3 Sheets-Sheet 1
Fig. 1
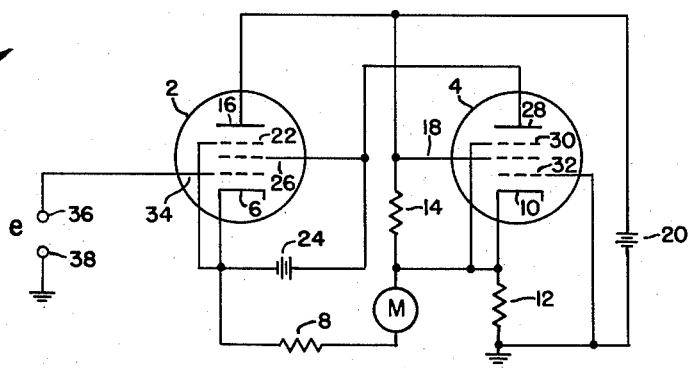
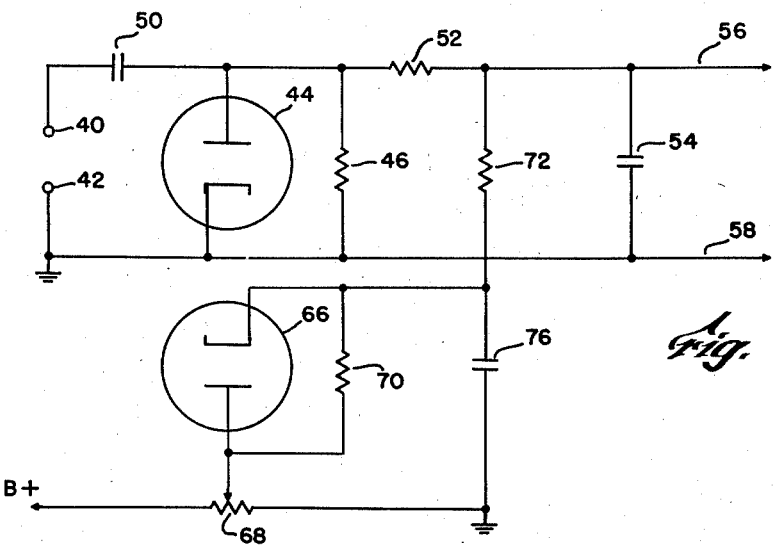
Fig. 2
Fig. 3
George E. Pihl
Inventor
by Parker, Chittick & Russell
Attorneys Dec. 2, 1958     G. E. PIHL     2,863,118
VACUUM TUBE VOLTMETER
Filed May 29, 1957     3 Sheets-Sheet 2

George E. Pihl
Inventor
by Porter, Chittick & Russell
Attorneys

Dec. 2, 1958

G. E. PIHL 2,863,118

VACUUM TUBE VOLTMETER

Filed May 29, 1957

George E. Pihl
Inventor
by Porter, Chittick & Russell
Attorneys

United States Patent Office 2,863,118
Patented Dec. 2, 1958

2,863,118

VACUUM TUBE VOLTMETER

George E. Pihl, Abington, Mass., assignor to Acton Laboratories, Inc., Acton, Mass., a corporation of Massachusetts Application May 29, 1957, Serial No. 662,484

8 Claims. (Cl. 324—123)

This invention relates to vacuum tube voltmeters and more particularly to a wide range, stable and calibrated voltmeter.

The primary object of this invention is to provide a vacuum tube voltmeter adapted to measure direct voltage, alternating voltage and resistance which is characterized by its wide operating range in both magnitude and frequency and its relatively negligible effect upon the circuit being measured.

Another object of this invention is to provide a vacuum tube voltmeter comprising a conventional voltmeter and a measuring circuit interposed between the voltmeter and the voltage to be measured comprising a highly degenerative amplifier adapted to transfer the unknown voltage at a high impedance level to the terminals of a voltmeter at a low impedance level with only a small easily compensated error.

A more particular specific object of this invention is to provide a vacuum tube voltmeter having a basic measuring circuit comprising a two stage direct-coupled amplifier having a high inverse feedback which stabilizes the instrument against changes in calibration arising from vacuum tube aging.

Another object of this invention is to provide a voltmeter particularly adapted to measure A. C. voltage by means of an A. C. probe of the type comprising a thermionic rectifying diode, said voltmeter comprising means for balancing the initial voltage output of said diode to produce a zero initial voltage at the input of said voltmeter in the absence of an input signal.

Another object of this invention is to provide a vacuum tube volt-ohmmeter having in its power supply a voltage regulator for providing a constant voltage source for its ohmmeter section, thereby attaining the stability of battery operation together with the convenience of complete line-voltage operation.

Other objects and many of the attendant advantages of the present invention will become apparent by reference to the following detailed specification when considered together with the accompanying drawings wherein:

Fig. 1 illustrates in simplified form the basic measuring circuit embodied in the present invention;

Fig. 2 is a diagram of a conventional rectifying circuit commonly embodied in a probe used for measurement of alternating voltage, said circuit being characterized by an initial voltage output in the absence of input signal;

Fig. 3 is a circuit diagram illustrating how the initial voltage output of a thermionic probe diode is balanced to produce zero initial voltage applied to the voltmeter.

Figure 4:
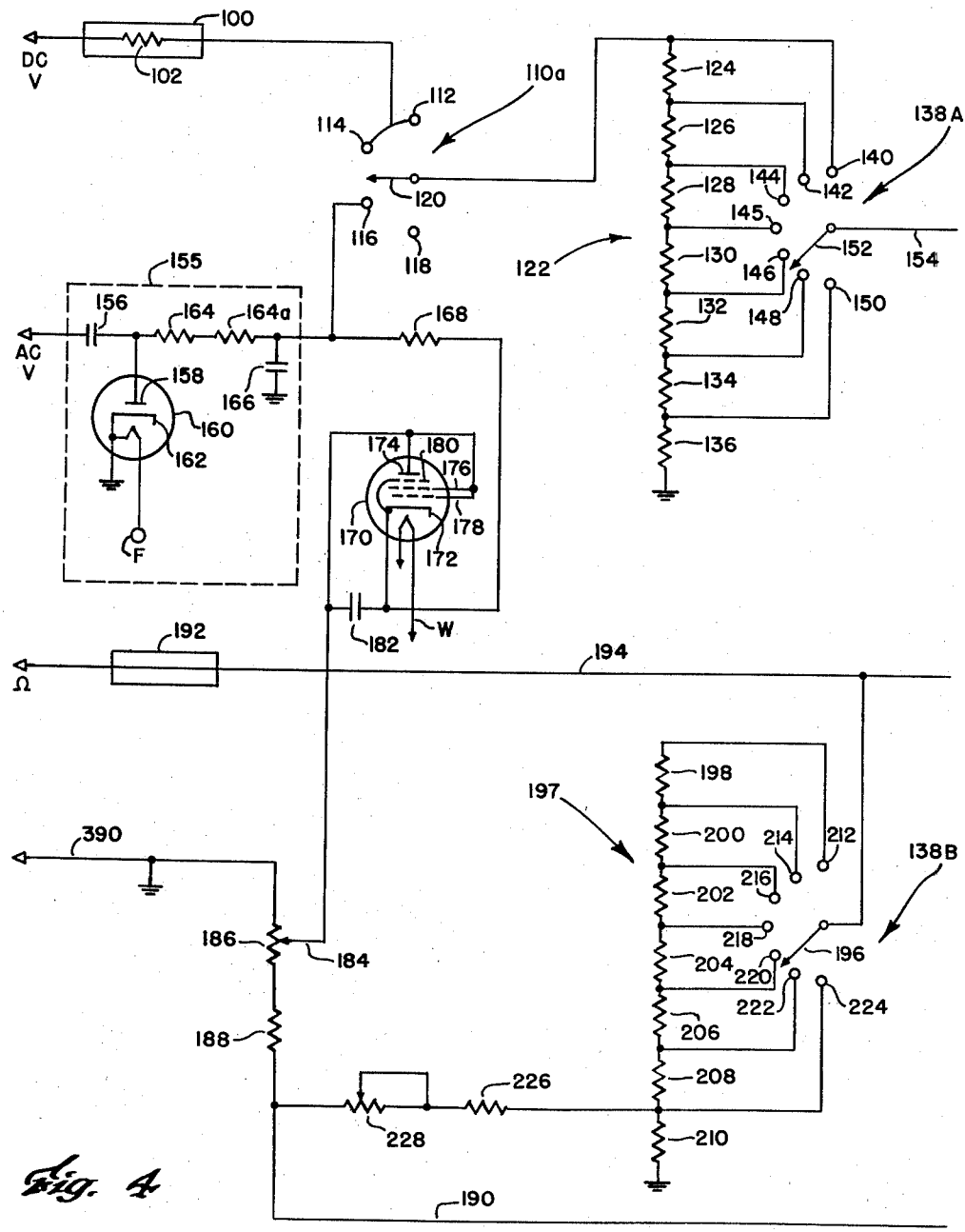
Figs. 4 and 4a together illustrate the complete circuit of a voltmeter constructed according to and embodying the present invention.

Referring now to Fig. 1 there is shown a measuring circuit employing a high gain, two stage direct-coupled totally fed back amplifier. The measuring circuit amplifier comprises two multigrid tubes 2 and 4. The cathode 6 of tube 2 is connected to one side of a meter M through a resistor 8. The cathode 10 of tube 4 is connected to the other side of meter M and is also connected to ground through a resistor 12. Meter M is also connected by way of a resistor 14 to the plate 16 of tube 2. The screen grid 18 of tube 4 is connected between resistor 14 and plate 16. The juncture of screen grid 18 and plate 16 is connected to the positive side of a battery 20. The negative side of the battery 20 is connected to ground. The suppressor grid 22 of tube 2 is connected to cathode 6. Both suppressor grid 22 and cathode 6 are connected to the negative side of a battery 24. On its positive side battery 24 is connected to screen grid 26 of tube 2 and plate 28 of tube 4. The suppressor grid 30 of tube 4 is connected to cathode 10 of the same tube. The control grid 32 of the second stage of the amplifier is connected to ground. The control grid 34 of the first stage of the amplifier is connected to a terminal 36. The voltage $e$ to be measured is applied between terminals 36 and 38, terminal 38 being connected to ground.

Operation of this measuring circuit is as follows: A positive signal voltage to be measured ($e$) is applied to the measuring circuit between grid 34 of tube 2 and ground. This applied signal voltage renders tube 2 more conductive, causing an increase in plate current to flow through resistor 8, the meter M, and resistor 12. This increase in plate current causes a meter deflection. The drop across resistor 12, appearing on the control grid 32 of tube 4, causes a decrease in the plate current of tube 4 which flows through resistor 8 and the meter M in such a direction as to add to the meter deflection. The end result consists of a total current flow such that the change in voltage between the cathode 6 of tube 2 and ground is very nearly equal to the applied signal voltage $e$, since the loop gain is high.

The calibration of meter M in terms of $e$, therefore, depends primarily upon its resistance and the resistance 8, and to a lesser extent on resistance 12. The effect of tube parameters is practically negligible.

It is essential that the amplifier be balanced such that in the absence of input signal $e$ the current through the meter M is zero. This is accomplished by providing two voltage sources 20 and 24 feeding the plate circuits of the two tubes such that the difference of their plate currents is metered by meter M. The difference is metered directly without the need for adding resistors or any other circuitry which would cause shunting of meter M and its multiplier.

By adjusting the initial plate currents to equal value with zero input signal, the current through the meter M will be zero. The stability of the zero setting is good because any disturbance affecting one tube of the amplifier is likely to similarly affect the other and not appear in the difference current. The use of two power sources 20 and 24 also has the advantage that fixed screen voltages are available for tubes 2 and 4 with respect to their own cathodes, thus resulting in true pentode operation. The resistors 12 and 14 function to establish an initial bias on the two tubes so as to place them in a suitable operating region for sufficient gain and for negligible grid current.

The output impedance is sufficiently low to drive the indicating meter and its multiplier resistance and long time accuracy is assured.

For measurements of alternating voltage it is usual to precede the conventional D. C. section of a voltmeter with a rectifying circuit and, particularly for very high frequency operation, it is usual to utilize a rectifying circuit comprising a linear peak shunt thermionic diode. The rectifying circuit is commonly embodied in the housing of the probe used for measurement of alternating current voltage, and this practice is followed in the present invention.

Referring now to Fig. 2, there is presented a diagram of a conventional rectifying circuit employing a thermionic diode. As is readily observed, this circuit comprises two terminals 40 and 42 between which the A. C. input voltage is applied. Connected to terminals 40 and 42 in parallel relation with each other are a thermionic diode 44 and a resistor 46. The plate of diode 44 and one end of resistor 46 are connected to terminal 40 by way of a capacitor 50. A resistor 52 and a capacitor 54 are connected in series with each other and in parallel with diode 44 and resistor 46. Terminal 42 is grounded. The output appears between terminals 56 and 58.

Summarized briefly, operation of the circuit of Fig. 2 is as follows: When the voltage applied between terminals 40 and 42 swings in a positive direction so as to make the plate of diode 44 positive with respect to its cathode, diode 44 conducts and no voltage output is obtained between terminals 56 and 58. When the voltage applied between terminals 40 and 42 swings negative so as to make the plate of diode 44 negative with respect to its cathode, the diode will not conduct and a negative output voltage appears across terminals 56 and 58. The output is integrated by capacitor 54 so as to be substantially a direct current output.

The trouble with the circuit of Fig. 2 is that there is an initial negative voltage output from the diode when no input signal is being applied between terminals 40 and 42. Moreover, this voltage is generally nonlinearly related to heater voltage and, therefore, zero offset will occur with line voltage changes which cannot be simply compensated for. One solution to the difficulty, employed in some voltmeters, consists of the use of a balancing diode similar to the measuring diode. If this diode is placed in the grid circuit of the second tube 4 of the measuring circuit illustrated in Fig. 1, the effects of line voltage variation are balanced out. However, this leads to another difficulty, since to provide for different voltage ranges it is essential to follow the measuring diode on its output side with a D. C. attenuator. Unfortunately, the attenuator also attenuates the initial voltage of the measuring diode, thereby necessitating a similar attenuator in the output of the balancing diode. Unless the two attenuators remain balanced as the range is varied, zero offset occurs as the range is changed.

To avoid this the present invention employs a balancing diode in a novel manner as indicated in Fig. 3. Fig. 3 duplicates the rectifying circuit of Fig. 2, identical elements being referred to by identical numerals. Fig. 3, however, also shows a thermionic rectifying tube 66 having its plate connected to the tap of a variable resistance 68 which is connected on one side to a positive voltage B and on the other side to ground. The plate and cathode of tube 66 are connected by a dropping resistor 70. The cathode of tube 66 is connected to a resistor 72 which is connected to terminal 56. A capacitor 76 is connected between ground and the juncture of the cathode of tube 66 and resistor 72.

Operation of the circuit of Fig. 3 is as follows: In the absence of an input voltage applied between terminals 40 and 42, tube 44 produces a negative direct voltage. The second diode 66, being coupled in inverted condition to the first diode 44, acts to produce a positive output which opposes the initial negative output of diode 44. By adjusting the tap of variable resistor 68 the output of diode 66 can be set at a level which when added to the negative output of diode 44 by way of resistor 72, results in a zero initial voltage at the juncture of resistors 52 and 72. Since this voltage tends to remain at zero regardless of line voltage changes and independent of range selection, the A. C. zero setting is highly stable.

Figure 4A:
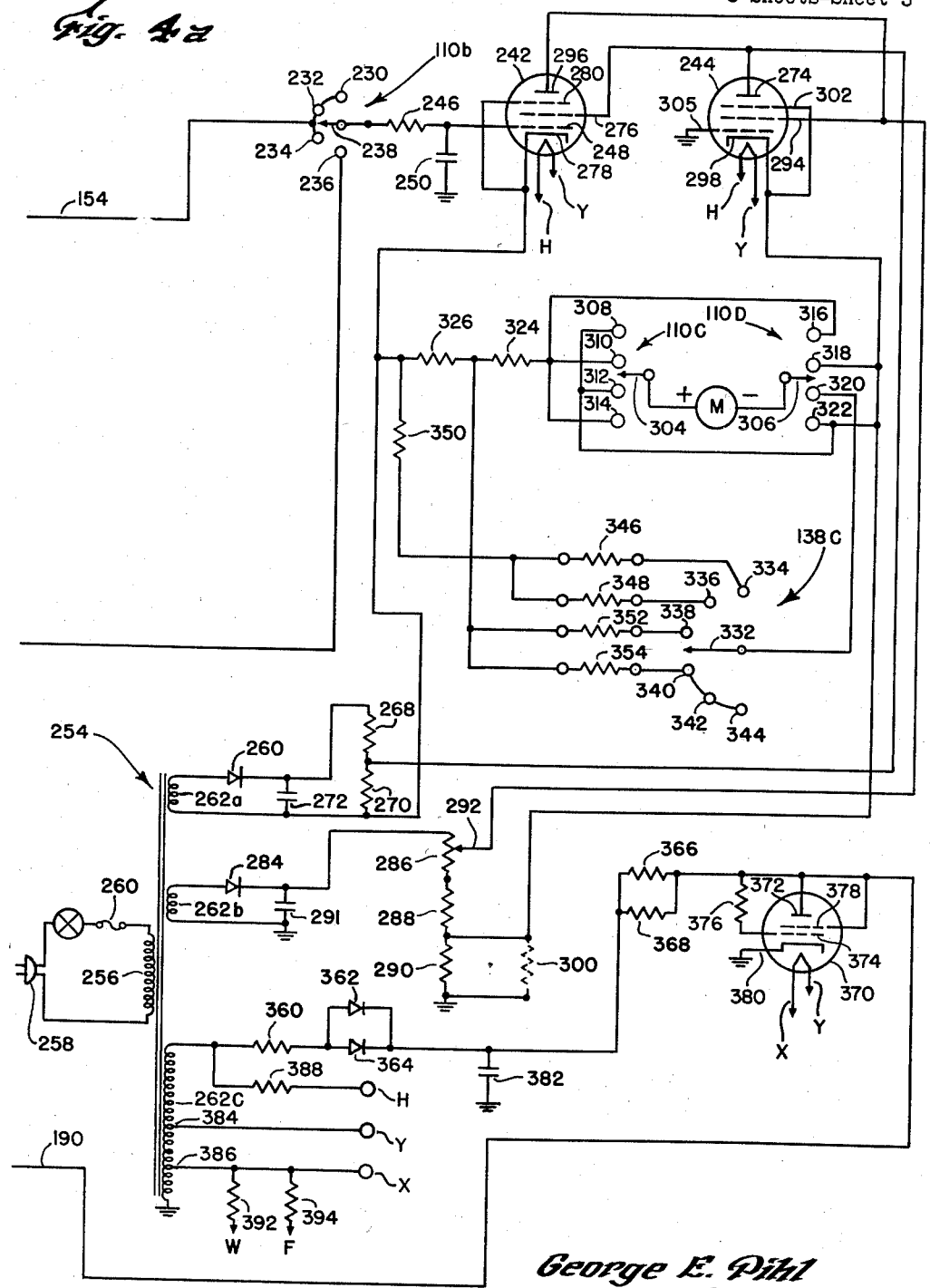

Referring now to Figs. 4 and 4a there is shown a detailed circuit diagram of a preferred embodiment of the present invention.

In the illustrated embodiment of Figs. 4 and 4a three inputs are provided, one for measuring D. C. voltage, one for measuring A. C. voltage, and the third for measuring resistance. The D. C. voltage measurement is accomplished using a D. C. probe 100 of conventional construction which contains a high value isolating resistor 102 in its tip to prevent the introduction of undesirable shunt capacitance. The D. C. probe is connected to fixed terminals 112 and 114 of a four-position switch section 110a. Switch section 110a is mechanically coupled to switch sections 110b, 110c, and 110d, the four sections being ganged together to make up one large switch assembly. The fixed terminals 112 and 114 are connected together. Switch section 110a has two other terminals 116 and 118 in addition to terminals 112 and 114. Switch terminal 116 is connected to an A. C. probe described hereinafter. Switch terminal 118 is unconnected. The pole terminal 120 of switch section 110a is connected to a voltage divider network generally identified by numeral 122. This voltage divider network comprises a series of resistors 124, 126, 128, 130, 132, 134, and 136 connected together. Resistor 136 is connected to ground. The pole terminal 120 of switch section 110a is connected to resistor 124. The juncture of resistor 124 and pole terminal 120 is connected to the fixed terminal 140 of a seven-position switch section 138a. Switch section 138a is mechanically coupled to switch sections 138b and 138c, the three sections being coupled together to make up one large switch assembly. The second fixed terminal 142 of switch section 138a is connected between resistors 124 and 126. The third fixed terminal 144 is connected between resistors 126 and 128. The fourth switch terminal 145 is connected between resistors 128 and 130. The fifth terminal 146 is connected between resistors 130 and 132. Sixth terminal 148 is connected between resistors 132 and 134; and terminal 150 is connected between resistors 134 and 136. Pole terminal 152 is connected by a lead 154 to a switch section 110b.

The terminal 116 of switch section 110a is connected to an A. C. probe which is contained in a housing 155. The A. C. probe comprises a thermionic diode 160 whose plate 158 is connected to a coupling capacitor 156 which in turn is connected to the tip of the probe. The juncture between plate 158 and capacitor 156 is connected to a resistor 164 which in turn is connected in series with a resistor 164a. Resistor 164a is connected in turn to terminal 116 of switch section 110a. A capacitor 166 is connected between terminal 116 and resistor 164a on one side and to ground on the other side. Also connected to terminal 116 is a balancing tube 170. The balancing tube is connected to terminal 116 by means of a resistor 168, the latter being connected in series with its cathode 172. In the illustrated embodiment the balancing tube is a pentode. The plate 174 of the pentode is connected to the screen grid 176 and the control grid 178 and the suppressor grid 180 is connected to the cathode 172. Because of the connections between the various grids, the plate and the cathode, the pentode 170 functions as a diode and, accordingly, may be replaced by a thermionic diode. The cathode 172 is connected to plate 174 by means of a capacitor 182. The juncture between capacitor 182 and plate 174 is connected to the tap 184 of a potentiometer 186. Potentiometer 186 is connected at one end to ground and at the other end to a resistor 188 which is connected in series by a lead 190 to a power supply. The power supply is described hereinafter.

Resistance measurement is accomplished by means of a resistance probe 192 which is coupled by means of a lead 194 to the movable contact 196 of switch section 138b. The fixed terminals of this switch section are connected to a voltage divider network 197. The latter comprises a series of resistors 198, 200, 202, 204, 206, 208, and 210. Resistor 210 is connected to ground. Resistor 198 is connected at one side to the first fixed terminal 212 of a switch section 138b. The second fixed terminal 214 is connected between resistors 198 and 200; the third fixed terminal 216 is connected between resistors 200 and 202; fourth terminal 218 is connected between resistors 202 and 204; fifth terminal 220 is connected between resistors 204 and 206; sixth terminal 222 is connected between resistors 206 and 208; and the seventh terminal 224 is connected between resistors 208 and 210. Connected between the juncture of resistors 208 and 210 and lead 190 leading to the power supply are resistor 226 and variable resistor 228. Lead 194 is connected to switch section 110b. Switch section 110b comprises four fixed terminals 230, 232, 234, and 236. Terminals 230, 232, and 234 are connected to each other and also to lead 154 which is connected to the pole terminal 152 of switch 138a. Terminal 236 is connected to lead 194.

At this point it is to be noted that the function of switch section 110a is to selectively connect and disconnect D. C. probe 100 and A. C. probe 155 relative to voltage divider 122. Switch section 110b functions to selectively connect to the measuring circuit the output of voltage divider network 122 and voltage divider network 197.

The two switch sections operate together. When switch section 110a is closed to terminal 112, switch section 110b is closed to terminal 230. This same is true in turn for terminals 114, 116 and 118 on the one hand and terminals 232, 234 and 236 on the other hand. Accordingly when switch section 110a is closed to terminal 118 which is free of any other circuit connection, switch section 110b is closed to terminal 236, in which case the measuring circuit will be connected to voltage divider network 197 for resistance measurements and disconnected from the divider network 122 used for A. C. and D. C. voltage measurements.

Movable contact 238 of switch section 110b picks off the voltages applied to terminals 230, 232, 234, and 236 and applies them to the measuring circuit, which comprises two pentodes 242 and 244 connected to operate in the same manner as the two tubes 2 and 4 of the circuit illustrated in Fig. 1. The voltages picked off by contact 238 are applied by way of a resistor 246 to the control grid 248 of tube 242. Capacitor 250, which is connected between grid 248 and ground, and resistors 246 constitute a filter.

Power sources for each of the two tubes 242 and 244, the balancing tube 170, the ohmmeter section of the voltmeter, and the filaments of the several tubes are provided by means of a step-down transformer 254. The primary 256 of the transformer is adapted to be connected to a 110 volt, 60 cycle power line by means of a conventional plug 258. A fuse 260 is provided in the circuit of the primary coil for protection against overloading. The secondary section of transformer 254 comprises three coils 262a, 262b, and 262c. Secondary coil 262a and its associated circuitry corresponds to the power source 24 of Fig. 1. Secondary coil 262b and its associated circuitry corresponds to the power source 20 of Fig. 1. Secondary coil 262c and its associated circuitry provide power for the ohmmeter section, tube 170 and the filaments of the various tubes.

Looking first at secondary coil 262a, it is connected in series with a selenium rectifier 266 and two resistors, 268 and 270. A capacitor 272 is connected in parallel with the two resistors. The juncture of resistors 268 and 270 is connected to the plate 274 of tube 244 and the screen grid 276 of tube 242. The other side of resistor 270 is connected directly to the cathode 278 of tube 242. The suppressor grid 280 of tube 242 also is connnected directly to the cathode 278.

With regard to secondary coil 262b, it is connected in series with a selenium rectifier 284 and three resistors 286, 288 and 290. Resistor 290 is connected to secondary coil 262b through ground. Connected in parallel with the three resistors is a capacitor 291. Resistor 286 is a potentiometer. The movable tap 292 of this potentiometer is connected to the screen grid 294 of tube 244 and the plate 296 of tube 242. The potentiometer 286 functions as the direct current zero control for the feedback amplifier section of the instrument. The cathode 298 of tube 244 is connected between resistors 288 and 290. Resistor 290 is shunted by a resistor 300 which functions to set the grid bias of amplifier tube 244. The grid bias may be reset by replacement of resistor 300. To indicate that resistor 300 is replaceable it is shown in broken lines. The suppressor grid 302 of tube 244 is connected directly to cathode 298 and its control grid 305 is connected to ground.

The output of the measuring circuit is applied to a meter M. The terminals of the meter are connected to the movable contacts 304 and 306 of switch sections 110c and 110d. Switch section 110c has four fixed terminals, 308, 310, 312 and 314. Switch section 110d also has four fixed terminals 316, 318, 320 and 322. Terminals 308 and 312 of switch section 110c are connected to each other and also to terminal 322 of switch section 110d. Terminals 310 and 314 of switch section 110c are connected to each other and also to terminal 316 of switch section 110d. Terminals 310, 314, and 316 are connected to cathode 278 of tube 242 by way of serially connected resistors 324 and 326. Terminals 318 and 322 of switch section 110d are both connected to the cathode 298 of tube 244. Terminal 320 is connected to the movable contact 332 of switch 138c. Switch 138c is provided with six fixed terminals, 334, 336, 338, 340, 342 and 344. Terminals 340, 342 and 344 are tied together. Terminal 334 is connected to a resistor 346. Terminal 336 is connected to a resistor 348. Resistors 346 and 348 are both connected to a resistor 350 which is also connected to the cathode 278 of tube 242. Terminals 338 and 340 are connected to resistors 352 and 354 respectively. These two resistors in turn are connected between resistors 324 and 326. Resistor 326 is a precision multiplier which is trimmed by resistor 324 for individual precise calibration of each unit. The purpose of multiplying resistors 346 through 354 is to allow precise calibration of the voltmeter to compensate for the particular diode rectifier incorporated in the A. C. probe. As is well known, the output of a diode rectifier is non-linear at low voltages, becoming nearly linear at high voltages. For this reason the resistors 346 through 354 are incorporated to allow precise calibration in the non-linear region. The three highest voltage ranges provided for measurement of alternating current voltages use a common multiplier resistor 354, the terminals 340, 342 and 344 being connected to each other.

Switch section 138c is ganged for operation with switch sections 138a and 138b, the movable contacts of all three switch sections moving in the same direction as illustrated in the drawings. Accordingly, terminal 344 of switch section 138c corresponds to terminal 148 of switch section 138a and terminal 222 of switch section 138b. When the contact 152 of switch section 138a is moved to engage terminal 150 of that switch section, the contact 332 of switch section 138c moves beyond terminal 344 and thereby disconnects the meter from the circuit. Accordingly the highest possible A. C. voltage measurement range of the instrument is the range determined when contact 152 of switch section 138a engages terminal 148.

Switch sections 110c and 110d, as stated previously, are ganged together with switch sections 110a and 110b. Accordingly when the movable contact 120 of switch section 110a is connected to terminal 112, contact 238 of switch section 110b is connected to terminal 230, contact 304 is connected to terminal 308, and contact 306 will be connected to terminal 316. As the contact 120 of switch section 110a is rotated in turn through the other terminals of its switch section (counterclockwise in Fig. 4), contacts 238, 304 and 306 rotate in turn through their fixed terminals. When contacts 120, 238 and 304 rotate counterclockwise, contact 306 rotates clockwise (Fig. 4a).

It is to be understood that meter M is of the type having a dial adapted to provide both voltage and resistance measurements and a needle that swings only to one side of zero. Accordingly it is necessary to reverse the connection to the meter according to the polarity of the voltage to be measured. In the illustrated embodiment this reversal of connections is accomplished by switch sections 110c and 110d, the positive side of the meter being connected to contact 304 and the negative side of the meter being connected to contact 306.

Keeping in mind the fact that an alternating current voltage to be measured appears at the control grid of tube 242 as a negative voltage and that the voltage developed across an unknown resistance to be measured appears as a positive voltage at the same grid, the meter must be connected in one direction for alternating current and negative direct current voltages and in the opposite direction for positive direct current voltage and resistance measurements.

Accordingly, in the illustrated embodiment, if the polarity of the direct current voltage to be measured is negative, contact 120 will be connected to terminal 112, contact 238 will be connected to terminal 230, contact 304 will be connected to terminal 308 and contact 306 will be connected to terminal 316. When the polarity of the direct current voltage to be measured is positive, contact 120 will be connected to terminal 114, contact 238 will be connected to terminal 232, contact 304 will be connected to terminal 310 and contact 306 will be connected to terminal 318. When the voltage to be measured is an alternating current voltage, contact 120 will be connected to terminal 116, contact 238 will be connected to terminal 234, contact 304 will be connected to terminal 312 and contact 306 will be connected to terminal 320. When a resistance is to be measured, contact 120 will be connected to terminal 118 (which is not connected to any other part of the circuit), contact 238 will be connected to terminal 236 leading to the ohmmeter section, contact 304 will be connected to terminal 314 and contact 306 will be connected to terminal 322.

Looking now to secondary coil 262c, one end of this coil is connected to ground. The other end of this coil is connected to a resistor 360 which is connected in turn to a pair of selenium rectifiers 362 and 364 connected in parallel with each other. These selenium rectifiers in turn are connected in series with a pair of resistors 366 and 368 which are connected in parallel with each other. Lead 190 connects resistors 366 and 368 in series with resistors 186 and 188 back to ground. A capacitor 382 has one plate connected between rectifiers 362 and 364 on the one hand and resistors 366 and 368 on the other hand, and the other plate is connected to ground.

Connected in series with resistors 366 and 368 and in parallel with resistors 186 and 188 is a multigrid thyratron 370. Its plate 372 and its secondary grid 378 are directly connected to resistors 366 and 368. Its primary grid 374 is connected to resistors 366 and 368 by way of a resistor 376 and its cathode 380 is connected to ground. Thyratron 370 functions as a voltage regulator. The arc drop of tube 370 under excitation from the high resistance direct current supply is sufficiently stable to serve as a constant voltage source for the ohmmeter section of the voltmeter as well as supplying a fixed voltage for the alternating current zero set circuit. The potentiometer comprising tap 184 and resistor 186 is provided to permit zero adjustment of the probe diode output voltage.

This stabilized direct current power source furnishes a fixed voltage E which is applied through an adjustable standard resistance (divider network 197) to the measuring circuit and to the measuring terminals (resistance probe 192 and ground clip lead 390). If the measuring terminals are open-circuited, the voltage E is present at the input to the measuring unit and may be adjusted by resistance 228 for full scale reading. If an unknown resistor is then connected across the measuring terminals, the measured voltage e is reduced according to the following equation:

$$e = E\frac{R_x}{R_x + R_s}$$

where $R_x$ is the unknown resistance and $R_s$ is the standard resistance. Accordingly the meter can be directly calibrated in ohms, with the setting of the standard resistance serving as a multiplier.

Secondary coil 262c is provided with two intermediate taps 384 and 386 which are connected to terminals Y and X respectively. Also connected to coil 262c at the same end as resistor 360 is a resistor 388 which is connected in turn to a terminal H. Connected between tap 386 and terminal X are two additional resistors 392 and 394 connected to terminals W and F respectively. The secondary coils 262a and 262b are adapted to provide 45 volts (5 ma.). Secondary coil 262c is adapted to provide an output of 6.3 volts (1.5 ma.) between successive taps. Terminals H, Y, X, W and F are utilized to supply current to the filaments of the various tubes. Identical letters indicate the exact connections made between the filaments, the tubes and the output terminals of secondary coil 262c.

The tubes and the values of the components of the embodiment illustrated in Figs. 4 and 4a are identified in the following list:

*Tubes*

| Component: | Type |
|---|---|
| 160 | 201-C |
| 170 | 6AQ5 |
| 242 | 6AU6 |
| 244 | 6AU6 |
| 370 | 2D21 |

*Rectifiers*

| Component: | Type |
|---|---|
| 266 | Federal 1159 |
| 284 | Federal 1159 |
| 362 | Bradley SE11U2H |
| 364 | Bradley SE11U2H |

Resistors

[In ohms and ½ watt unless otherwise specified.]

| Component | Value | Watts |
|---|---|---|
| 102 | 25M (1%) | |
| 124 | 50M (1%) | 1 |
| 126 | 17.5M (1%) | 1 |
| 128 | 5M (1%) | |
| 130 | 1.75M (1%) | |
| 132 | 500K (1%) | |
| 134 | 175K (1%) | |
| 136 | 75K (1%) | |
| 164 | 12M (5%) | |
| 164a | 10M (5%) | |
| 168 | 50M (1%) | |
| 186 | 10K | |
| 188 | 47K | |
| 198 | 9M (1%) | |
| 200 | 900K (1%) | |
| 202 | 90K (1%) | |
| 204 | 9K (1%) | |
| 206 | 900 (1%) | |
| 208 | 90 (1%) | |
| 210 | 11 (1%) | |
| 226 | 82 | |
| 228 | 100 | |
| 246 | 4.7M | |
| 268 | 4.7K | |
| 270 | 22K | |
| 286 | 10K | |
| 288 | 22K | |
| 290 | 1K | |
| 326 | 10K (1%) | |
| 350 | 7.5K (1%) | |
| 360 | 10 | |
| 366 | 120 | 2 |
| 368 | 120 | 2 |
| 376 | 1M | |
| 388 | 1 | 2 |
| 392 | 5.1 | 2 |
| 394 | 5.1 | 2 |

The value of resistors 300, 324, 346, 348, 352 and 354 vary according to individual voltmeters.

Capacitors

[In microfarads.]

| Component | Value | Volts |
|---|---|---|
| 156 | .007 | 450 |
| 166 | .005 | 500 |
| 182 | .01 | 200 |
| 250 | .005 | 200 |
| 272 | 12 | 250 |
| 292 | 12 | 250 |
| 382 | 150 | 150 |

Fuses

Component: Value
260 _____ .5 ampere

A voltmeter embodying the circuit illustrated in Figs. 4 and 4a will have the following ranges:

(1) Full scale ranges of 1–3–10–30–100–300–1000 volts (plus and minus) for direct current voltage measurements.

(2) Full scale ranges of 1–3–10–30–100–300 volts (R. M. S.) for alternating current voltage measurements.

(3) Resistance can be measured directly in overlapping ranges from .2 ohm to 500 megohms. The meter scale is calibrated in resistance over the range from 0.2 to 500 ohms and the reading of the meter is multiplied by the setting of network 197, which provides range multipliers of 1, 10, 100, 1K, 10K, 100K and 1M.

It is to be noted that the values of the resistances of voltage divider network 122 (used for both direct and alternating current voltage measurement) are so proportioned that the same voltage is applied to the measuring circuit for each of the full scale voltages.

For alternating current voltage measurements, precise calibration in the 1, 3, 10, and 30 to 300 volt full scale ranges is provided by resistors 346, 348, 352 and 354 respectively.

Voltmeters constructed according to the preceeding specification have been found to provide the following accuracy:

(1) Direct current voltage: Plus or minus 2% of full scale.

(2) Alternating current voltage: Plus or minus 3% of full scale (low frequency).

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. A wide frequency band voltage measuring circuit comprising a feedback amplifier having two stages, said first stage comprising a vacuum tube having a first plate, a first control grid, a first screen grid, and a first cathode, said second stage comprising a vacuum tube having a second plate, a second control grid, a second screen grid, and a second cathode, said first plate and said second screen being connected together, said second plate and said first screen being connected together, a first resistor connected between said second cathode and ground, a second resistor and a meter connected in series in the order named between said first and second cathodes, a third resistor connected between said second screen grid and said meter, a first source of direct current having a positive terminal connected to said second plate and said first screen grid and a negative terminal connected to said first cathode, a second source of direct current having a positive terminal connected to said first plate and said second screen grid and a negative terminal connected to ground, means connecting said second control grid to ground, and means for applying a signal to be measured between said first control grid and ground.

2. A wide frequency band voltage measuring circuit comprising a feedback amplifier having two stages, said first stage comprising a vacuum tube having a first plate, a first control grid, a first screen grid, and a first cathode, said second stage comprising a vacuum tube having a second plate, a second control grid, a second screen grid, and a second cathode, said first plate and said second screen being connected together, said second plate and said first screen being connected together, a first resistor connected between said second cathode and ground, a second resistor and a meter connected in series in the order named between said first and second cathodes, a third resistor connected between said second screen grid and said meter, a first source of direct current having a positive terminal connected to said second plate and said first screen grid and a negative terminal connected to said first cathode, a second source of direct current having a positive terminal connected to said first plate and said second screen grid and a negative terminal connected to ground, means connecting said second control grid to ground, a voltage divider, means for applying an input signal to be measured to said voltage divider and means for applying the output of said divider to said first control grid.

3. A measuring circuit comprising a two-stage feedback amplifier, each stage comprising a vacuum tube having a plate, a cathode, a control grid and a screen grid, a first direct current voltage source connected in its positive side to the plate of one tube and the screen grid of the other tube and on its negative side to the cathode of said other tube, a second direct current voltage source connected on its positive side of the plate of said other tube and the screen grid of said one tube and on its negative side to ground, a first resistor connected between the cathode of said one tube and ground, means connecting the control grid of said one tube to ground, a meter connected on one side to the cathode of said one tube, a second resistor connected on one side to the cathode of said other tube and on the other side to the other side of said meter, and means for applying a signal voltage to be measured between the control grid of said other tube and ground.

4. In a voltmeter a measuring circuit comprising a two stage feedback amplifier, each stage comprising a vacuum tube having a plate, a cathode, a control grid and a screen grid, means for applying a voltage to be measured between the control grid of the first stage and ground, a first direct current voltage supply connected on its negative side to the cathode of said first stage and connected on its positive side to the screen grid of said first stage and the plate of said second stage, a second direct current voltage supply connected on its positive side to the plate of said first stage and the screen grid of said second stage and connected on its negative side to ground, means connecting the control grid of said second stage to ground, a first resistor connected on one side to the cathode of said first stage, a second resistor connected between the cathode of said second stage and ground, a meter, first switch means for connecting the positive side of said meter to the other side of said first resistor when the voltage to be measured is positive and for connecting the positive side of said meter to the cathode of said second stage when the voltage to be measured is negative, and second switch means for connecting the negative side of said meter to the cathode of said second stage when the voltage to be measured is positive and for connecting the negative side of said meter to the other side of said first resistor when the voltage to be measured is negative.

5. The combination of claim 4 wherein said first and second switch means are ganged together for simultaneous operation.

6. The combination of claim 4 further including an alternating current probe, said probe comprising a thermionic vacuum tube diode having its cathode connected to ground and its plate connected to the input of said probe through a coupling condenser, a third resistor connected on one side to the plate of said diode, means connecting the other side of said third resistor to the control grid of said first stage, and a rectifier having its output connected to the juncture of said third resistor and said last mentioned means for balancing the initial output of said diode to produce a zero input to the control grid of said first stage in the absence of an input signal to said probe.

7. The combination of claim 6 wherein said rectifier comprises a thermionic vacuum tube having its plate connected to a stabilized source of positive voltage and its cathode connected to the juncture of said third resistor and said last-mentioned means by way of a fourth resistor.

8. The combination of claim 7 wherein the plate of said thermionic vacuum tube is connected to said stabilized source of positive voltage through a potentiometer, whereby to permit adjustment of the output of said rectifier to balance the initial voltage output of said diode in the absence of an input signal to said probe.

References Cited in the file of this patent

UNITED STATES PATENTS 2,329,073    Mitchell et al. _____ Sept. 7, 1943

OTHER REFERENCES

"General Radio Experimenter," published by General Radio Co., Cambridge, Mass., May 1942, 9 pages. Only Fig. 3 of page 2 relied upon. (Copies available in 324–123.)

Article by Wilbur Flaherty published in Radio & Television News, March 1949, pages 59–61, and 153–155. Only Fig. 2 on page 60 relied upon. (Copies available in Scientific Library.)